United States Patent
Wilkerson et al.

(10) Patent No.: US 7,360,436 B2
(45) Date of Patent: Apr. 22, 2008

(54) REUSABLE PRELOAD INDICATING WASHER ASSEMBLY

(75) Inventors: Jeffrey A. Wilkerson, Bothell, WA (US); John R. Porter, Lynnwood, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/510,200

(22) Filed: Aug. 25, 2006

(65) Prior Publication Data

US 2006/0283260 A1 Dec. 21, 2006

Related U.S. Application Data

(63) Continuation of application No. 10/991,639, filed on Nov. 17, 2004, now Pat. No. 7,096,740.

(51) Int. Cl.
*F16B 31/02* (2006.01)
*G01B 5/30* (2006.01)

(52) U.S. Cl. .................................................. 73/761

(58) Field of Classification Search .......... 73/760–761
See application file for complete search history.

(56) References Cited

U.S. PATENT DOCUMENTS 4,230,326 A * 10/1980 White .......................... 277/637
5,226,683 A * 7/1993 Julien et al. .................. 285/363
5,957,462 A * 9/1999 Nishiyama et al. ........... 277/580

* cited by examiner

*Primary Examiner*—Max Noori
(74) *Attorney, Agent, or Firm*—Wildman, Harrold, Allen & Dixon, LLP

(57) ABSTRACT

A reusable washer assembly apparatus includes a generally ring-shaped flexible inner member, a generally ring-shaped outer member, a distal washer member, and a proximate washer member. The outer member is disposed around the inner member and is adapted for at least partial rotation about the inner member. The flexible inner member and outer member define a first gap between each other. The distal washer member communicates with a first surface of the inner member and the proximate washer member communicates with a second surface of the inner member. An applied force to at least one of the proximate washer member and the distal washer member causes the flexible inner member to deform and at least partially fill the first gap thereby preventing rotation of the outer member when the applied force reaches a threshold value.

24 Claims, 2 Drawing Sheets

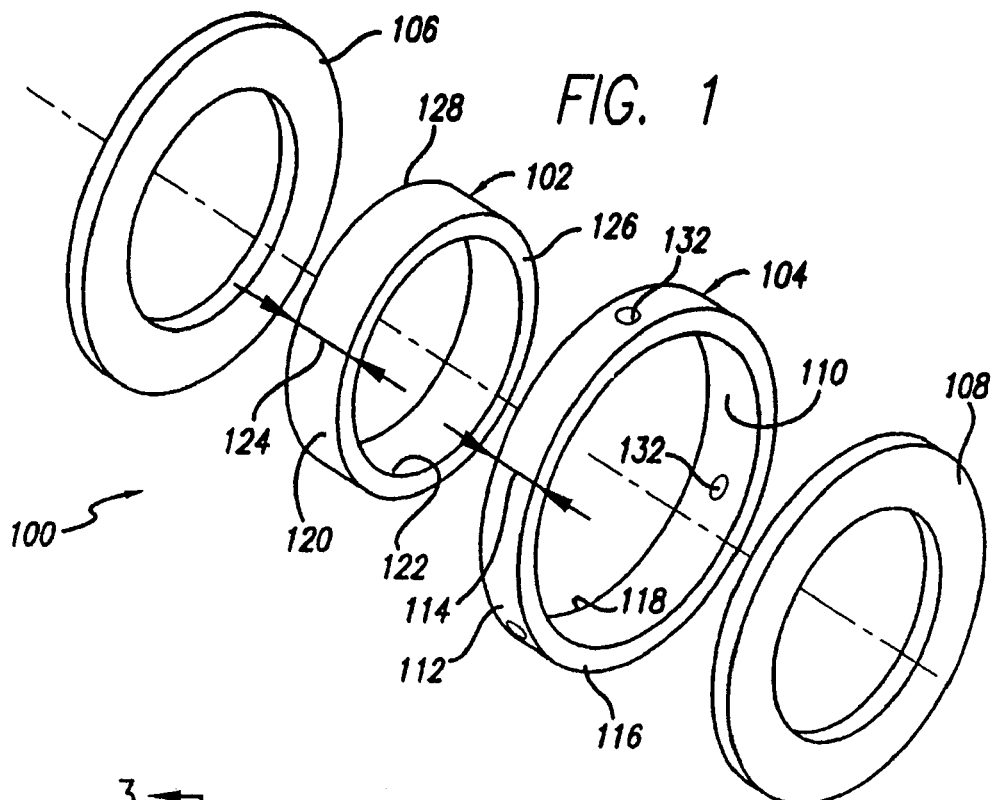
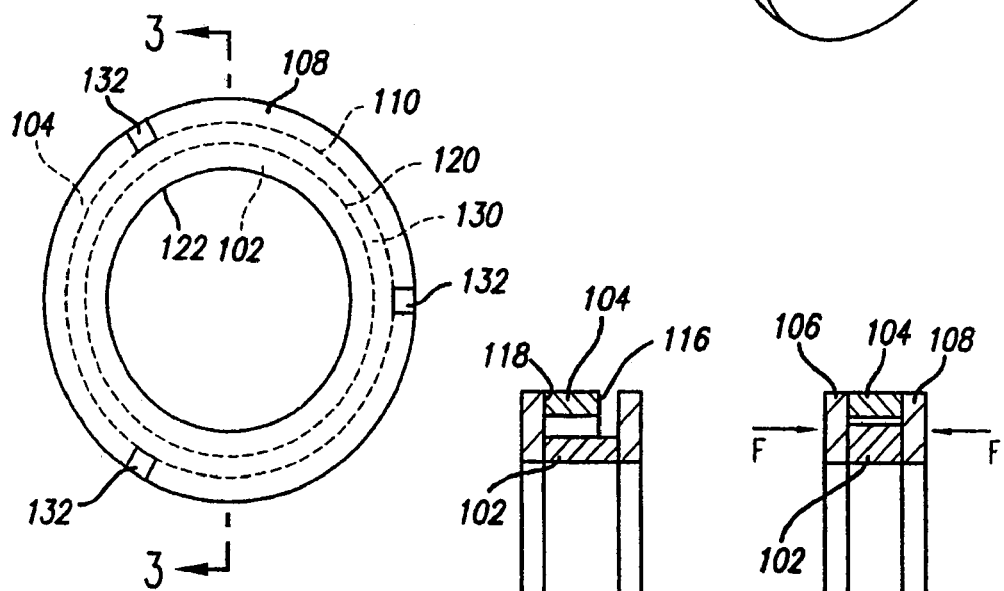
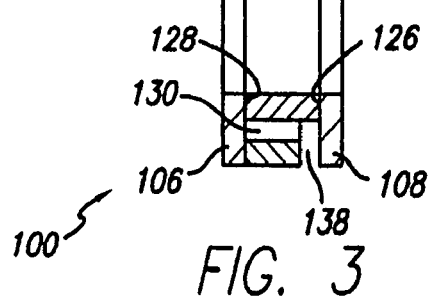
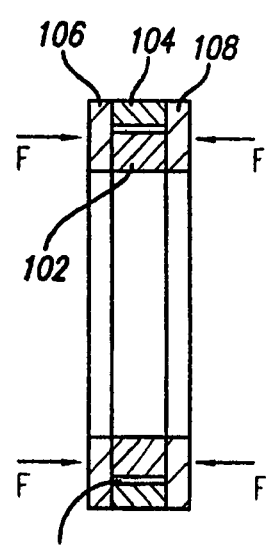
FIG. 1
FIG. 2
FIG. 3
FIG. 4

REUSABLE PRELOAD INDICATING WASHER ASSEMBLY

CROSS REFERENCES TO RELATED APPLICATIONS

This is a continuation of prior application Ser. No. 10/991,639 filed Nov. 17, 2004, by inventors Jeffery A. Wilkerson and John R. Porter, entitled "Reusable Preload Indicating Washer Assembly," now U.S. Pat. No. 7,096,740, which is incorporated by reference in its entirety.

FIELD OF INVENTION

This invention relates to fastening devices, and more particularly, to preload indicating washer assemblies that may be used in connection with bolts and nuts, with externally threaded studs, or with other fasteners, shafts, axles or rods.

BACKGROUND

Preload indicting washer assemblies are used with fastening devices such as, for example, nuts and bolts, for critical applications where it is important to know a predetermined compression value applied by the fastening devices or an axial tension in a bolt, rod, etc. Examples of important applications for such assemblies may include the fastening of certain critical joints of aircraft, etc.

The use of torque wrenches do not always provide consistent indications of the compression or load actually applied by the fasteners. That is, even when the same torque (as read by a torque wrench) is applied to a plurality of fasteners of the same fastener type and size, differing preloads are actually experienced on the fasteners due to tolerance variations in the manufacture of the fasteners, including small variations in fastener dimensions, materials and coatings, as well as variations in any lubrication that may be applied. It is believed that under some circumstances, the application of the same torque as read by a torque wrench to a plurality of bolts supplied under the same part number, can result in a variation of 25% or more in the load actually applied by the bolts. Thus preload indicating washer assemblies can be used with application-critical fasteners to provide a more accurate indication of the actual compression applied by the fasteners on their associated joints. Additionally, these assemblies can be used to provide an indication of compression in joint locations that are not accessible by torque wrenches.

Known preload indicating washer assemblies function by a plastic deformation of an inner ring member to "indicate" when the proper bolt load is reached. That is, the inner ring member is concentrically mated with an outer ring member having a shorter axial height than the inner ring member. The inner and outer ring members are sandwiched between two, standard washers. This assembly is mated with a bolt or other fastener so that the shorter, outer ring member can be made to manually rotate around both the taller inner ring member as well as the fastener when no compression, or when a compression below the rated load, is applied.

In operation, the inner ring member is subjected to compression applied by the fastener, such as a bolt, as two or more components of a structure are being assembled. When the desired, predetermined compression is reached, the inner ring member is plastically deformed so that the two standard washers abut each end of the outer ring member with sufficient force that the outer ring member is no longer able to rotate around the inner member or the fastener. Thus by manually attempting to rotate the outer ring member from time to time as increasing compression is applied, the user can know that the desired, predetermined compression has been reached when the outer ring member can no longer be manually rotated.

Because the deformation of the inner rings of known, preload indicating washer assemblies is plastic and permanent, these assemblies cannot be reused to indicate proper bolt or fastener loading. Another washer assembly, or at least another inner ring component, must be used. Additionally, if the joint or bolt loses tension due to relaxation etc. of the assembled structure, the act of simply retightening the nut (and thereby re-applying increased compression to the previously-deformed inner ring) will not ensure an adequate joint load.

Thus it is desirable to provide an improved preload indicating washer assembly that is repeatable, i.e. that can be reused and/or re-tightened while retaining the ability to accurately indicate the design or rated compression experienced by it.

SUMMARY OF THE INVENTION

Washer assemblies are provided that indicate proper fastener loading. In addition, these assemblies are reusable. For instance, after an applied force is removed, the force can later be reapplied (i.e., a fastener can be re-tightened) and the assembly will still indicate when proper fastener loading is reached.

In many of these embodiments, a reusable washer assembly apparatus includes a generally ring-shaped flexible inner member, a generally ring-shaped outer member, a distal washer member, and a proximate washer member. The outer member is disposed around the inner member and is adapted for at least partial rotation about the inner member. The flexible inner member and outer member define a first gap between each other.

The distal washer member communicates with a first surface of the inner member and the proximate washer member communicates with a second surface of the inner member. An applied force to at least one of the proximate washer member and the distal washer member causes the flexible inner member to deform and at least partially fill the first gap thereby preventing rotation of the outer member when the applied force reaches a threshold value.

In other examples, the outer member and the proximate washer member define a second gap. In this case, the applied force causes the flexible inner member to deform and at least partially fill the second gap, thereby preventing rotation of the outer member when the applied force reaches the threshold value.

The applied force can be applied via a fastener. In one example, the fastener is a bolt. Other types of fasteners may also be used.

Additionally, the inner member may be constructed from various types of materials. For instance, the inner member may be constructed of nitinol.

In others of these embodiments, the outer member has an outer surface and a lug extending from an outer surface of the outer member. In other examples, the apparatus is used with an actuator and the outer member has an outer surface defining a bore adapted to receive the actuator.

Thus, various types of washer assemblies are provided that indicate when a certain force level has been applied to the assembly. The washer assemblies can be reused so that forces can be applied, removed, and reapplied and still accurately indicate whether a force threshold has been reached.

BRIEF DESCRIPTION OF THE DRAWINGS

FIG. 1 is an exploded, perspective view of a preload indicating washer assembly according to one embodiment of the present inventions.

FIG. 2 is a top plan view of the washer assembly of FIG. 1.

FIG. 3 is a cross-sectional view of the washer assembly of FIG. 2 without any compression force being applied, as viewed along lines 3-3 of FIG. 2.

FIG. 4 is a cross-sectional view of the washer assembly of FIG. 2 with a compression force applied.

DETAILED DESCRIPTION

Figure 5:
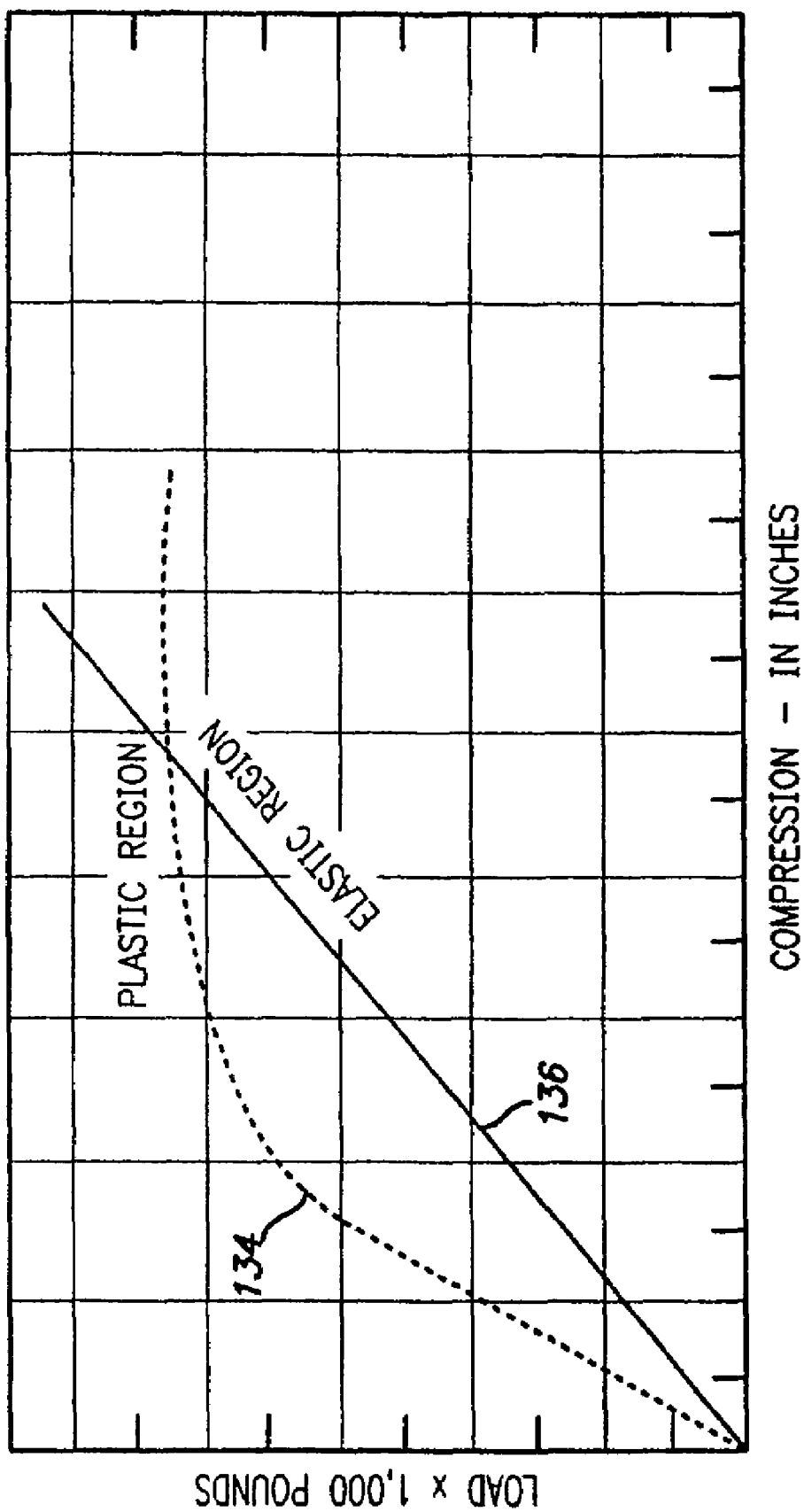
FIG. 5 is a stress-strain diagram of two materials.

In the following description, reference is made to the accompanying drawings which form a part hereof and which illustrate several embodiments of the present invention. It is understood that other embodiments may be utilized and structural and operational changes may be made without departing from the scope of the present invention.

One embodiment of the present invention provides an improved preload indicating washer assembly designed to operate in the elastic region for the rated, predetermined compression that is desired. Because it operates in the elastic region, the preload indicating washer assembly resumes its original shape when the compression is decreased or removed. The washer assembly elastically deforms again to the same extent as its original deformation when the predetermined compression is restored. Thus the washer assembly will indicate the proper fastener preload when used for multiple loading cycles or in multiple locations.

Referring to FIGS. 1-4, there is shown a preload indicating washer assembly 100 comprising an inner ring 102, an outer ring 104, a distal washer 106, and a proximate washer 108. The outer ring 104 has a cylindrically-shaped inner surface 110, a cylindrically-shaped outer surface 112 and an axial height 114. The inner diameter of the outer ring 104 is adapted to mate with a threaded extension of a bolt or with another elongated member (not shown) extending from a fastening apparatus or from any other surface. The outer ring 104 further has a proximate side 116 and a distal side 118 each of which connects the inner surface 110 and outer surface 112.

The inner ring 102 has a cylindrically-shaped outer surface 120, a cylindrically-shaped inner surface 122 and an axial height 124 that is greater than the axial height 114 of the outer ring 104. The inner ring 102 further has a proximate side 126 and a distal side 128, each of which connects the outer surface 120 and inner surface 122. The inner diameter of the inner ring 102 is also adapted to mate with the same bolt extension or other elongated member (not shown) as is used with the outer ring 104.

As best seen in FIGS. 2 and 3, the outer diameter of the inner ring 102 is less than the inner diameter of the outer ring 104 so that the inner and outer rings may be concentrically mated such that the outer ring inner surface 110 surrounds a portion of the inner ring outer surface 120. When the inner and outer rings 102, 104 are concentrically mated, the proximate washer 108 is placed so that it abuts the proximate side 126 of the inner ring 102. Similarly, the distal washer 106 is placed so that it abuts the distal side 128 of the inner ring 102. As so arranged, the assembly 100 is placed on the threaded extension of a bolt or on another elongated member. As best seen in FIG. 3, a first gap 130 is thereby formed between the inner surface 110 of the outer ring 104 and the outer surface 120 of the inner ring 102. Also, a second gap 138 is formed between the proximate washer 108 and the proximate side 116 of the outer ring 104. While the embodiment of FIGS. 1-4 shows the use of inner and outer rings, it will be appreciated that inner and outer members having other shapes and geometries may be used as well.

The outer ring 104 has a plurality of bores 132 extending from the outer surface 112 to the inner surface 110. These bores 132 are adapted to receive a peg or other actuator (not shown). When the assembly 100 is placed on a bolt or other elongated member, the user can insert the peg into one of the bores 132 so as to provide a manual grip for assistance in manually rotating the outer ring 104 around the inner ring 102 and the bolt. As best seen in FIG. 4, when a compression force (represented by the arrows designated by the letter "F") of a predetermined value corresponding to the rated load is placed on the inner ring 102, the inner ring deforms elastically such that any further rotation of the outer ring 104 is prevented or inhibited. This prevention/inhibition of the rotation is caused by the frictional force of the proximate and distal washers 108, 106 acting on the proximate and distal sides 116, 118 of the outer ring as is evident by the disappearance of the second gap 138 (FIG. 3).

In alternative embodiments, however, the inhibition/prevention of the rotation is caused by the deformation of the inner ring outer surface 120 such that it abuts the outer ring inner surface 110 with sufficient frictional force to inhibit or prevent any further rotation of the outer ring 104. Thus in such alternative embodiments, the first gap 130 (FIG. 3) would disappear when the predetermined compression force is applied.

While the embodiment of FIGS. 1-4 shows bores 132 that are used with pegs, it will be appreciated that other designs may be employed to facilitate the rotation of the outer ring 104. For example, the outer ring 104 can include one or more lugs extending from the outer surface 112 for use in gripping the outer ring 104. Alternatively, the outer surface 112 can have a plurality of knurls to assist in gripping the outer ring 104.

The inner ring 102 is constructed of a material that is adapted to deform elastically in the design operating range of the rated, predetermined compression. According to one embodiment of the invention, the inner ring 102 is constructed of nitinol, i.e. a nickel titanium alloy. Exemplary nitinol can be obtained from Nitinol Technologies, Inc., of Auburn, Wash. under the designation "60 Nitinol." However, other embodiments of the invention may be constructed of other materials that deform elastically for the desired, rated compression load.

FIG. 5 is a stress-strain diagram showing force deflection curves for two materials used as inner ring components of preload indicating washer assemblies. The material represented by the dotted line 134 shows the behavior of a material used for known inner ring components. The design or rated compression for the known device is in the plastic region of this curve 134. Thus as can be seen, any removal and subsequent restoration of compression on such a device would not result in a reliable and repeatable deformation of the material for purposes of indicating the actual compression at a joint.

The solid line 136 shows the behavior of a material used according to one embodiment of the invention. In contrast to known preload indicating devices, this material operates in the elastic region for the rated, predetermined compression. Thus any removal and subsequent restoration of compression on a device made of this material results in a reliable change in the deformation for purposes of indicating the amount of applied compression. This therefore provides the desired "repeatability" of a preload indicating device.

It will be appreciated that preload indicating washer assemblies can be designed for different rated or predetermined compression loads by the selection of different materials according to their stress-strain characteristics. Additionally, variations in design loads can be achieved by varying the height or thickness of the inner ring component, or in alternative embodiments of the invention, by varying the width of the gap between the outer surface of the inner ring and the inner surface of the outer ring.

In operation according to some embodiments, the distal washer 106 is placed around a threaded extension of a bolt or other elongated member (not shown). Next, the inner ring 102 and the outer ring 104 are placed around the bolt extension and are aligned concentrically with one another so that the outer ring inner surface 110 surrounds a portion of the inner ring outer surface 120. Then, the proximate washer 108 is placed around the threaded extension so that it abuts the outer ring proximate side 116.

By exerting a torque on a nut engaged with the threaded extension, a first axial compression is applied to the assembly 100, including the inner ring 102. This first compression is less than a predetermined value corresponding to the design or rated compression of the inner ring 102. Using an actuator engaged in one of the bores 132 of the outer ring 104, the outer ring 104 is at least partially rotated around both the inner ring 102 and the threaded extension thus confirming that the design compression has not been reached. Next, a second compression that is less than the rated load is applied to the assembly, including the inner ring 102. The outer ring 104 is again rotated thus again confirming that the design compression has not yet been achieved.

This process is continued until the compression experienced by the inner ring 102 reaches the predetermined, rated compression value. At this point, the inner ring 102 will elastically deform such that the proximate washer 108 abuts the proximate side 116 of the outer ring 104, and the distal washer 106 abuts the distal side 118 of the outer ring 104 with sufficient force to inhibit rotation of the outer ring 104. (Or in alternative embodiments, the inner ring 102 will elastically deform such that the inner ring outer surface 120 abuts the outer ring inner surface 110 with sufficient force to inhibit the rotation of the outer ring 104.) At this point, when the actuator is used in an attempt to rotate the outer ring 104, it will be observed that the outer ring 104 cannot rotate thus indicating that the rated compression as experienced by the inner ring 102, the fastener and the joint has been reached.

A some later time, the compression on the assembly 100 is reduced from the predetermined, rated load to a lower, second value, either intentionally or due to relaxation of the joint. The outer ring 104 is rotated thus confirming that the rated load is no longer present at the bolt. Next, a compression in the amount of the rated load is again applied to the assembly 100 and the inner ring 102. Once again the inner ring 102 elastically deforms as previously described so as to inhibit the rotation of the outer ring 104.

At yet another time, the compression on the assembly 100 is removed entirely, the nut is disengaged from the bolt and the assembly 100 is removed. This same assembly 100 is then reassembled on the original members or placed on another bolt or other type of fastener, and the above process is repeated.

Thus there is disclosed an improved preload indicating washer assembly that operates in the elastic region for the rated, predetermined compression that is desired. Because it operates in the elastic region, the preload indicating washer assembly resumes its original shape when the compression is decreased or removed. The washer assembly elastically deforms again to the same extent as its original deformation when the predetermined compression is restored. Thus the washer assembly will indicate the proper fastener preload when used for multiple loading cycles or in multiple locations.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A reusable washer assembly apparatus comprising: a generally ring-shaped flexible inner member; a generally ring-shaped outer member disposed around the inner member, the flexible inner member and outer member defining a first gap between the inner member and outer member, the outer member being adapted for at least partial rotation about the inner member; a distal washer member communicating with a first surface of the inner member; and a proximate washer member communicating with a second surface of the inner member such that an applied force to at least one of the proximate washer member and the distal washer member causes the flexible inner member to deform and at least partially fill the first gap thereby preventing rotation of the outer member when the applied force reaches a threshold value, wherein the outer member and the proximate washer member define a second gap and wherein the applied force causes the flexible inner member to deform and at least partially fill the second gap thereby preventing rotation of the outer member when the applied force reaches the threshold value.

2. The apparatus of claim 1 wherein the applied force is applied via a fastener.

3. The apparatus of claim 2 wherein the fastener is a bolt.

4. The apparatus of claim 1 wherein the inner member is constructed of nitinol.

5. The apparatus of claim 1 wherein the outer member has an outer surface and a lug extending from an outer surface of the outer member.

6. The apparatus of claim 1 wherein the apparatus is further for use with an actuator and wherein the outer member further has an outer surface defining a bore adapted to receive the actuator.

7. A reusable washer assembly apparatus comprising: a generally ring-shaped flexible inner member; a distal washer member communicating with a first surface of the inner member; a proximate washer member communicating with a second surface of the inner member; and a generally ring-shaped outer member disposed around the inner member and adapted for at least partial rotation around the inner member, the flexible inner member and outer member defining a gap between the inner member and the proximate washer member and wherein an applied force to at least one of the proximate washer member and the distal washer member causes the flexible inner member to deform and at least partially fill the gap thereby preventing rotation of the outer member when the applied force reaches a threshold value, wherein the outer member has an outer surface and a lug extending from an outer surface of the outer member.

8. The apparatus of claim 7 wherein the inner member is constructed of nitinol.

9. The apparatus of claim 7 wherein the apparatus is further for use with an actuator and wherein the outer member further has an outer surface defining a bore adapted to receive the actuator.

10. The apparatus of claim 7 wherein the applied force is applied via a fastener.

11. The apparatus of claim 10 wherein the fastener is a bolt.

12. A method for determining whether a force applied to a reusable washer assembly apparatus has reached a threshold value comprising: providing a generally ring-shaped flexible inner member and a generally ring-shaped outer member that is disposed around the inner member, the outer member being adapted for at least partial rotation about the inner member; positioning a distal washer member to communicate with a first surface of the inner member and a proximate washer member to communicate with a second surface of the inner member; positioning the flexible inner member and the outer member so as to define a first gap; and applying a force to the at least one of the distal washer member and the proximate washer member to cause the flexible inner member to deform and at least partially fill the first gap thereby preventing rotation of the outer member when the applied force reaches a threshold value.

13. The method of claim 12 further comprising removing the applied force, the removing the applied force responsively allowing further rotation of the outer member.

14. The method of claim 12 further comprising positioning the inner member and the proximate washer member so as to define a second gap between the inner member and the proximate washer member and wherein the applying the force causes the flexible inner member to deform and at least partially till the second gap thereby preventing rotation of the outer member when the applied force reaches the threshold value.

15. The method of claim 14 further comprising removing the applied force, the removing the applied force responsively allowing further rotation of the outer member.

16. The method of claim 12 wherein the inner member is constructed of nitinol.

17. The method of claim 12 wherein the applied force is applied via a fastener.

18. The method of claim 17 wherein the fastener is a bolt.

19. A reusable washer assembly apparatus comprising: a generally ring-shaped flexible inner member; a generally ring-shaped outer member disposed around the inner member, the flexible inner member and outer member defining a first gap between the inner member and outer member, the outer member being adapted for at least partial rotation about the inner member; a distal washer member communicating with a first surface of the inner member; and a proximate washer member communicating with a second surface of the inner member such that an applied force to at least one of the proximate washer member and the distal washer member causes the flexible inner member to deform and at least partially fill the first gap thereby preventing rotation of the outer member when the applied force reaches a threshold value, wherein the outer member has an outer surface and a lug extending from an outer surface of the outer member.

20. The apparatus of claim 19 wherein the outer member and the proximate washer member define a second gap and wherein the applied force causes the flexible inner member to deform and at least partially till the second gap thereby preventing rotation of the outer member when the applied force reaches the threshold value.

21. The apparatus of claim 19 wherein the applied force is applied via a fastener.

22. The apparatus of claim 21 wherein the fastener is a bolt.

23. The apparatus of claim 19 wherein the inner member is constructed of nitinol.

24. The apparatus of claim 19 wherein the apparatus is further for use with an actuator and wherein the outer member further has an outer surface defining a bore adapted to receive the actuator.

* * * * *